United States Patent [19]

Laube

[11] Patent Number: 5,516,243
[45] Date of Patent: May 14, 1996

[54] REAMER CHUCK AND TOOL EXPANDER

[75] Inventor: Robert Laube, Mount Clemens, Mich.

[73] Assignee: Hydra-Lock Corporation, Warren, Mich.

[21] Appl. No.: 367,945

[22] Filed: Jan. 3, 1995

[51] Int. Cl.$^6$ ...................................... B23B 31/30
[52] U.S. Cl. ...................... 408/239 R; 279/2.08; 279/4.03; 408/224
[58] Field of Search ................... 279/2.06, 2.08, 279/4.03, 132; 408/147, 150, 181, 224, 238, 239 R, 239 A

[56] References Cited

U.S. PATENT DOCUMENTS

| | | | |
|---|---|---|---|
| 2,744,756 | 5/1956 | Atherholt, Sr. | 279/2 |
| 3,030,120 | 4/1962 | Altherholt, Sr. | 279/46 |
| 3,516,681 | 6/1970 | Cox et al. | 279/4.03 |
| 3,677,559 | 7/1972 | Andre et al. | 279/4 |
| 3,830,509 | 8/1974 | Weber | 279/4.03 |
| 5,141,370 | 8/1992 | Baumann | 408/239 R |
| 5,286,042 | 2/1994 | Laube | 279/4.03 |

*Primary Examiner*—Daniel W. Howell
*Attorney, Agent, or Firm*—Barnes, Kisselle, Raisch, Choate, Whittemore & Hulbert

[57] ABSTRACT

A center tool with a shank receivable in a sleeve carried by a body of a holder which may have cutters on a work surface disposed outward of the sleeve. A hydraulic actuator forces the sleeve radially inward to grip, releasably retain and center the shank of the center tool to permit rapid removal and replacement of the center tool. The actuation may also react radially outwardly to move the body and cutters radially outward to vary and adjust the diameter of the bore machined by the cutters on work surfaces. Preferably, the tool holder has a shank received in a chuck with the holder or chuck having a hydraulically actuated sleeve to retain the tool holder in the chuck.

26 Claims, 4 Drawing Sheets

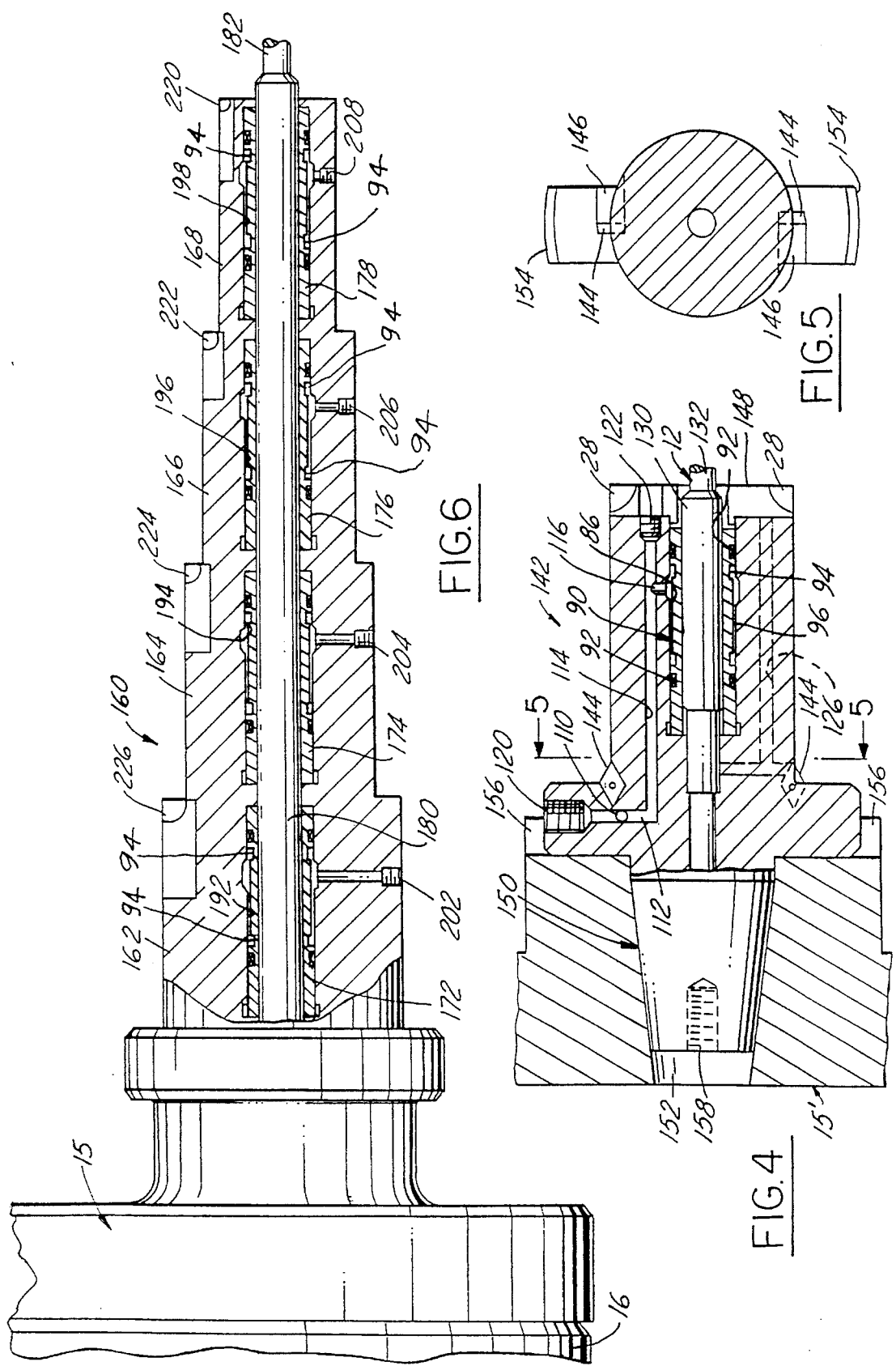

5,516,243

REAMER CHUCK AND TOOL EXPANDER

FIELD OF THE INVENTION

This invention relates to machine cutting tools and more particularly to a reamer with a hydrostatic tool holder.

BACKGROUND OF THE INVENTION

Hydrostatic holding devices have been used for a number of years to hold work parts which are to be machined or ground. U.S. Pat. No. 2,744,756 (May 8, 1956) shows an expansible elongate sleeve to underlie a work part. Another U.S. Pat. No. 3,030,120 (Apr. 17, 1962) shows the use of an expandable sleeve to expand an adapter to hold various work parts. The hydrostatically operated sleeve has also been used to contract inwardly to hold sleeve type work parts as illustrated in U.S. Pat. No. 3,677,559 issued Jul. 18, 1972.

SUMMARY OF THE INVENTION

A cutting tool holder body with an inner elongate, hydrostatically contracting sleeve within a confining cylinder of a tool body to circumferentially grip an adapter or a tool shank, for example, of a reamer, which has a cutting element extending from the sleeve in the main tool body. Tool bodies having outer diameter working surfaces such as carbide and diamond cutters sometimes have axial recesses to carry small tools which need frequent replacing. The present invention provides a means for rigidly locking the small tools and adapters in the larger tool body with excellent and repeatable concentricity. The radial force, which causes the sleeve to grip the inner tool shank, may have a controlled radially outward reaction force to adjust the outer diameter of cutters on the surface of the tool body. When diameter control of the outer body is desired, the same hydrostatic device can contract the sleeve to securely grasp the inner central replaceable tool and also expand the outer tool body to permit accurate diametric adjustment of the cutting elements on the outer body as well as firmly and concentrically grip the inner tool.

To increase the accuracy and repeatability of locating the tool or adapter grip by the sleeve, preferably the sleeve has a pair of grooves adjacent each end of its recess forming the hydrostatic chamber. To urge the tool or adapter axially toward one end of the sleeve and onto a positive stop, preferably the sleeve is attached to its carrier body adjacent only its other end.

It is, therefore, an object of the present invention to provide a hydrostatic holder for adapters and tools, such as a central replaceable reaming tool held in an outer tool body, and to utilize the holding device in some circumstances to control diametric dimensions of the outer tool body surrounding the central tool.

It is a further object to provide an axially extending tool with varying diameters carrying surface working tools, and a mechanism to adjust the diametrical dimensions individually for extreme accuracy in the cutting diameters while carrying a central reaction element with an extending reamer tool or other rotating tool.

BRIEF DESCRIPTION OF THE DRAWINGS

These and other objects, features and advantages of this invention will be apparent from the following appended claims, detailed description of the preferred embodiments and the best mode, and accompanying drawings in which:

FIG. 4 is a fragmentary sectional view of a modified form of the chuck of FIG. 1;

FIG. 5 is a cross sectional view taken generally on line 5—5 of FIG. 4;

FIG. 6 is a view of a modified reamer tool in which varying tool diameters can be individually controlled;

DETAILED DESCRIPTION

Figure 1:
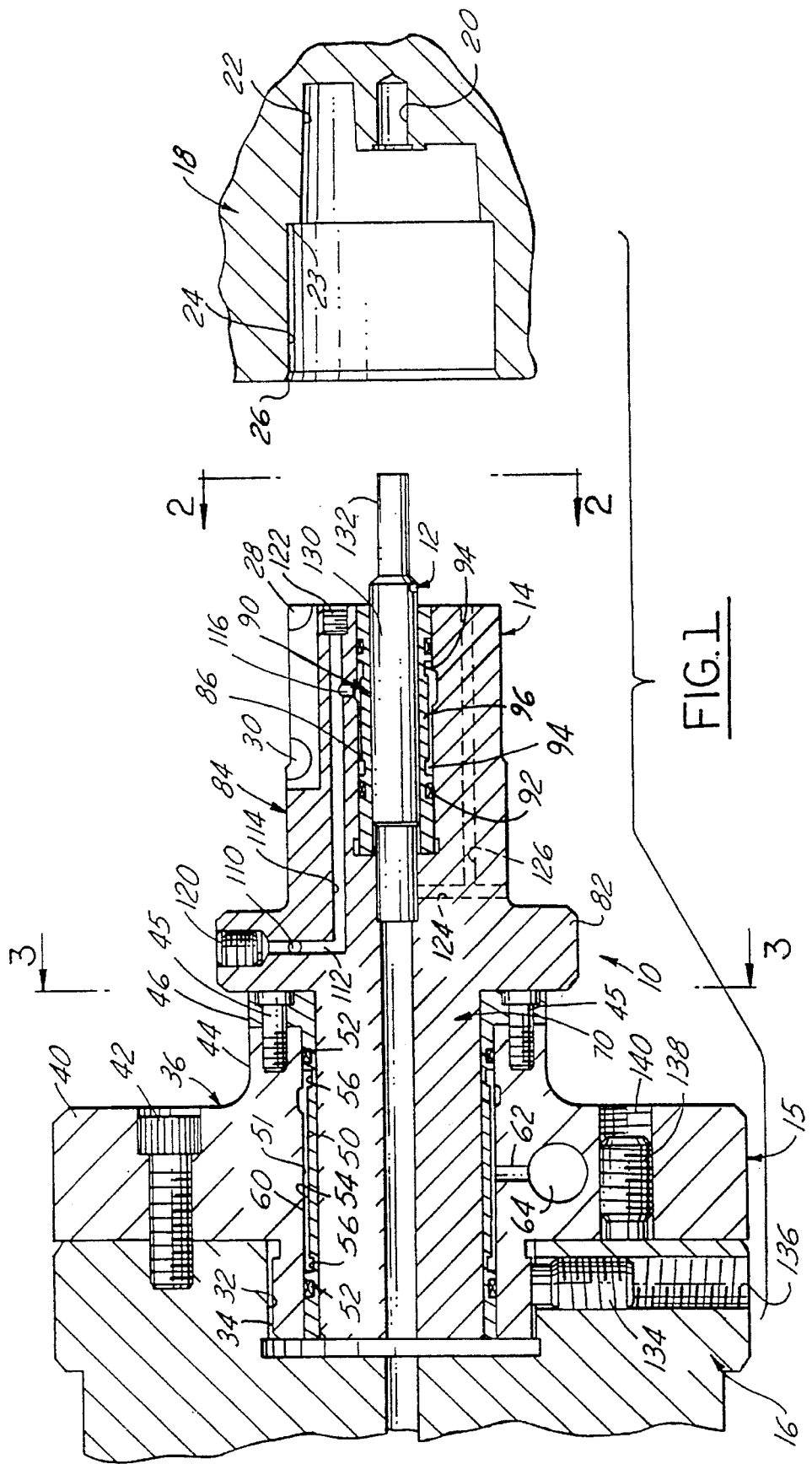
FIG. 1 is a sectional view of a workpiece and a reamer tool embodying the present invention received in a tool chuck.

With reference to the drawings, FIG. 1 illustrates a reamer 10 with a center tool 12 received in a tool holder 14 received in a chuck 15 driven by a spindle 16 of a machine tool for machining various surfaces of a workpiece 18. The workpiece has a center bore 20, an intermediate bore 22, a shoulder 23, an outer bore 24, and a chamfer 26. Preferably, the shoulder 23, bore 24 and chamfer 26 are finish reamed by inserts 28 and 30 which are preferably plated with polycrystalline diamonds (PCD) or other compounds such as cubic boron nitrides (CBN), tungsten carbide, titanium nitride (TIN), ceramics (VD)and the like.

The machine spindle 16 has a central recess 32 which receives a cylindrical projection 34 of the quick-change chuck 15 which has a radially extending flange 40 bolted to the face of the spindle 16 by cap screws 42 circumferentially spaced around the flange 40. The chuck has a forward projecting boss 44 against which is secured, with bolts 45, a flange 46 carrying a sleeve 50 projecting into a central cylindrical recess 51 of the chuck 40. The sleeve 50 has sealing grooves 52 at each end to carry suitable O-rings or other sealing devices. To increase the accuracy and repeatability of locating the holder 14, the sleeve has a reduced diameter 54 in the mid portion thereof and preferably grooves 56 at each end with smaller diameters than the reduced diameter of the sleeve. Thus, a thin annular chamber 60 is formed between the cylindrical recess 51 and the reduced diameter surface 54 of the sleeve 50, with the deeper grooves 56 being located at each end of the chamber 60. The grooves 56 are believed to provide a somewhat flexible connection of the recess to the remainder of the sleeve which in use more accurately centers the holder 14 in the chuck 15 and provides a more uniform radial contraction of the sleeve throughout its length. The improved accuracy of locating the holder is believed to be due to the grooves 56 permitting initially greater radially inward displacement of the adjacent edges of the sleeve 50 which, since they are spaced apart, initially engage the holder and accurately align it in the sleeve before the center portion of the sleeve engages and firmly clamps the holder in place. Regardless of the theoretical explanation, the spaced apart deeper grooves 56 do significantly improve the alignment and accuracy of location of the holder 14 in the sleeve 50. Preferably, to urge the holder 14 axially inwardly to be positively located by firmly bearing on the end face of the sleeve flange 46 when the sleeve 45 is actuated, the sleeve is secured to the chuck at only one end by the cap screws 45.

A connecting passage 62 leads from the chamber 60 to an actuating passage 64 in which a plunger 66 is properly sealed. Preferably, the pressure plunger consists of a dog point screw 66 driving a ball 67 against a brass disc 68 behind a TEFLON® or PTFE disc 69. The chamber 60, the grooves 56 and the passage 64 are filled with a heavy grease which transmits pressure from the actuating plunger 66 to the chamber 60. This pressure forces the wall of sleeve 50 radially inward into tight and circumferential contact with a cylindrical extension 70 of the holder 14 and grips the extension centrally of the interior of the sleeve 50. This hydrostatic gripping is generally described in the aforementioned U.S. Pat. Nos. 2,744,756, 3,030,120 and 3,677,559.

Figure 2:
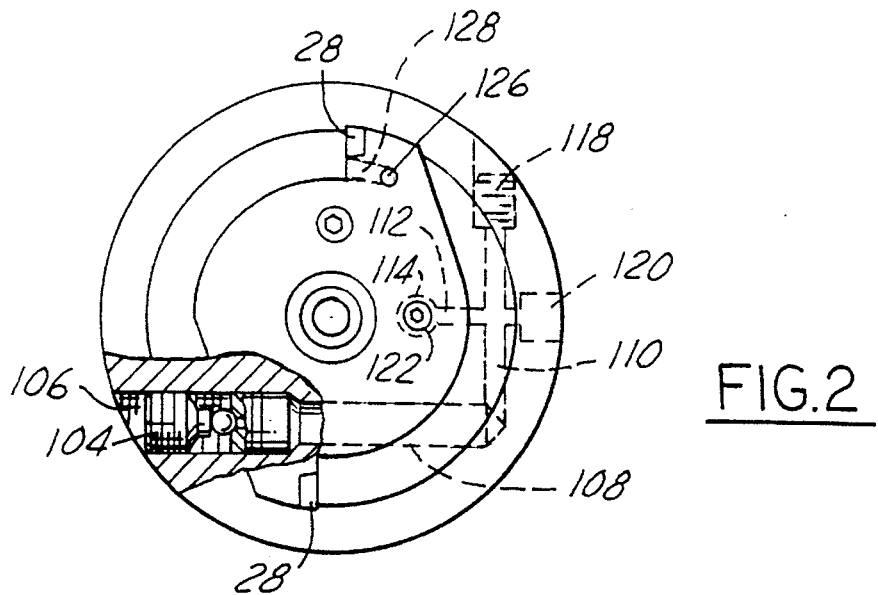
FIG. 2 is an end view of the reamer tool assembly.
Figure 3:
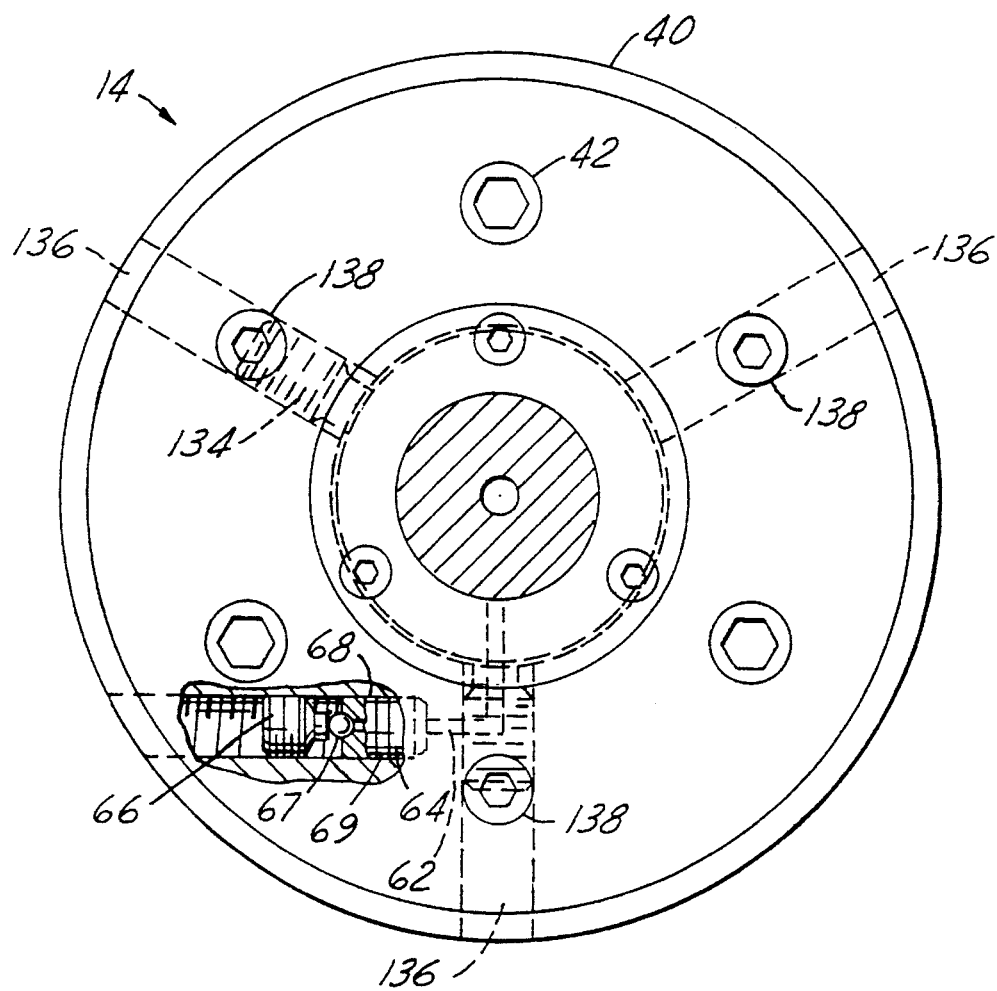
FIG. 3 is a cross sectional view taken generally on line 3—3 of FIG. 1.

The holder 14 also has an enlarged body section 82 abutting against the flange 46 and a forward operating extension 84 of smaller diameter. This forward extension has a central bore 86 which contains a gripping sleeve 90 having grooves 92 with seals and reduced diameter grooves 94 adjacent both ends of a reduced diameter mid section 96. With reference to FIG. 2, the sleeve is actuated by a screw plunger 104 threaded in a recess 106 which extends at 108 to a cross passage 110 which is connected by a transverse passage 112 to a longitudinal passage 114 with a port 116 communicating with the expansion sleeve 90. One end of the passages 110, 112 and 114 is closed by plugs 118, 120 and 122. Thus, when the various passages are filled with grease, the actuation of the plunger 104 will force the cylindrical wall of sleeve 90 radially inwardly. Passages 124, 126 and 128 are coolant passages for the tool inserts 28 and 30.

Received within the sleeve 90 is the round shank 130 of the separate center reamer tool 12 which has a working end 132 for finish reaming the bore 20 in workpiece 18. The pressurizing of the chamber surrounding the sleeve 90 will cause the sleeve to grip and center the shank 130 of the reamer tool 12. The reduced diameter grooves 94 improve the alignment, accuracy and repeatability of locating the reamer tool 12 in the holder 14.

The forward extension 84 of the holder 14 also carries the cutting inserts 28 for finish reaming the bore 24 of the workpiece 18 and the inserts 30 for finishing the chamfer 26. Preferably the inserts are brazed in complementary pockets in the forward extension 84 for increased accuracy although for some applications removable indexable inserts may be used. The reaming tool inserts 28 and 30 are shown diagrammatically on the holder body although, as previously mentioned, the surfaces of the inserts or even surfaces of holder body could be plated with polycrystalline diamonds or equivalent cutting surfaces to perform the reaming of the workpiece.

The main holder body 84 carries the tool shank 130 having the reamer end 132. This reamer end may need frequent replacing due to wear. This can be readily accomplished by backing off the plunger 104 to relieve pressure in the hydrostatic chamber of sleeve 90. Shank 130 can be withdrawn and the shank of a new center tool inserted. Repressurizing the sleeve 90 will securely grip and center the shank 130 so that the replacement reamer end 132 will again be accurately concentric for use in machining a work part.

The diameter of the bore 24 and the chamfer 26 are extremely critical and the inserts 28 and 30 must have very close tolerances to accomplish the desired result. According to the present invention, when the sleeve 90 is pressurized, there is a radial reaction force against the interior of the body 84. The magnitude of this reaction force can vary and control the outer diameter of the holder body. Accordingly, in addition to a centralized positive grip on tool shank 130, the working diameter of the holder tool body 84 and hence inserts 28 and 30 can be varied and adjusted somewhat to the desired size and to compensate for wear of the inserts 28 and 30.

To fine tune and adjust the alignment of the axis of the tool holder 14 with the axis rotation of the spindle 16, the spindle has three equally circumferentially spaced screws 134 each received in a threaded radial bore 136 and movable to bear on the cylindrical portion 34 of the chuck 15 to shift it radially into alignment with the axis of rotation of the spindle. To fine tune and essentially eliminate any eccentricity or orbital movement of the rotating cutter 132 of the reamer 12, the chuck 15 also has three equally circumferentially spaced screws 138 each received in a threaded axial bore 140 in the chuck and movable to bear on the end face of the spindle. After the screws 134 & 138 have been adjusted so that the axis of rotation of the cutter 132 of the reamer 12 is coincident with the axis of rotation of the spindle and any eccentricity has been essentially eliminated, the reamer can be replaced and exchanged as needed normally without further adjustment of the screws and in rare instances any further adjustment is minimal and requires very little time to do so. Similarly, as needed, the tool holder 14 itself can be removed and reinserted normally without requiring any further adjustment of the screws 134 & 138. This arrangement saves substantial setup time and effort when changing cutting tools that have become dull, worn, broken or otherwise need replacement.

FIGS. 4 and 5 illustrate a modified tool holder 142 with removable cutting inserts 144 releasably secured in pockets 146 for machining a chamfer and a removable nose plate 148 carrying the cutting inserts 28. For mounting the adapter in a chuck, it has a conical rear portion 150 with a Morse taper which is slidably received in a complementarily tapered recess 152 of a chuck 15'. These tapered portions coaxially align the holder 142 with the chuck. To prevent relative rotation, the holder has a pair of diametrically opposed dog ears 154 received in a complementary recess 156 in the chuck. The holder is releasably retained in the spindle by a drawbar (not shown), threaded into a blind hole 158 in the holder. The complementary tapered portions and the drawbar are used for aligning and securing the holder 142 in the chuck 15' in lieu of the hydrostatic sleeve arrangement of the holder 14 of FIG. 1. Preferably, the chuck 15' and spindle also have the fine tuning adjustment screws 134 & 138 for coaxially aligning the chuck and reamer tool with the axis of rotation of the machine spindle 16.

In some instances, it is desirable to have a tool for reaming or boring which has sections of varying diameters along its longitudinal axis. FIG. 6 illustrates a tool 160 embodying this invention with axial sections of varying diameters and having reaming cutters at each diameter. The tool can be received in a quick-change chuck 15 mounted on the spindle 16 of a machine tool.

The tool 160 has four sections 162, 164, 166 and 168 each of a different diameter and spaced along the axis of the tool. A central bore extends the length of the tool, and at each section there is located therein a separate hydrostatic sleeve 172, 174, 176 & 178 respectively. These sleeves have the same internal diameter and define a continuous passage for receiving an elongate tool shank 180 which may have a reamer tool 182 at the projecting end.

The sleeves have respectively cylindrical pressure chambers 192, 194, 196 and 198. Each pressure chamber is connected to a pressure actuator piston, shown diagrammatically at 202, 204, 206 and 208, to enable each chamber to be pressurized individually by actuation of its associated piston. Each tool section can carry cutters 220, 222, 224 & 226, respectively, and can be be plated with a diamond surface as previously described. Accordingly, the effective diameter of each tool at each section can be adjusted by pressurizing its associated sleeve. The shank 180 is, of course, also clamped securely when the sleeves are pressurized and serves as a reaction member for the added force required to expand each tool section individually.

Figure 8:
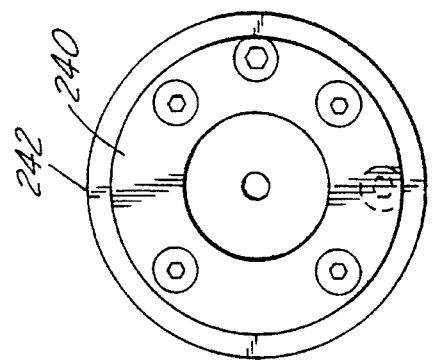
FIG. 8 is an end view of the tool holder of FIG. 7.
Figure 9:
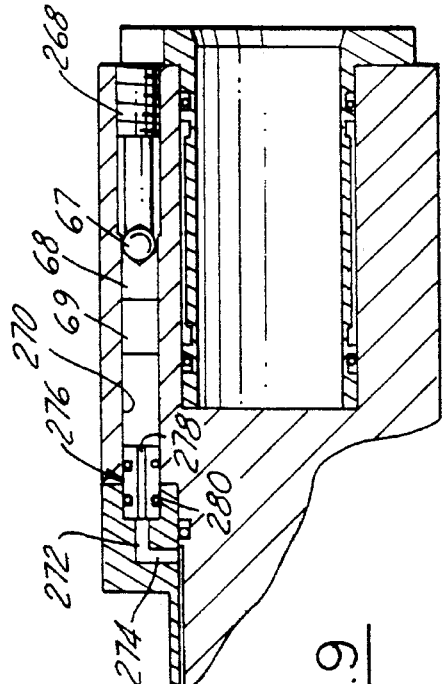
FIG. 9 is another sectional view of the tool holder of FIG. 7.
Figure 7:
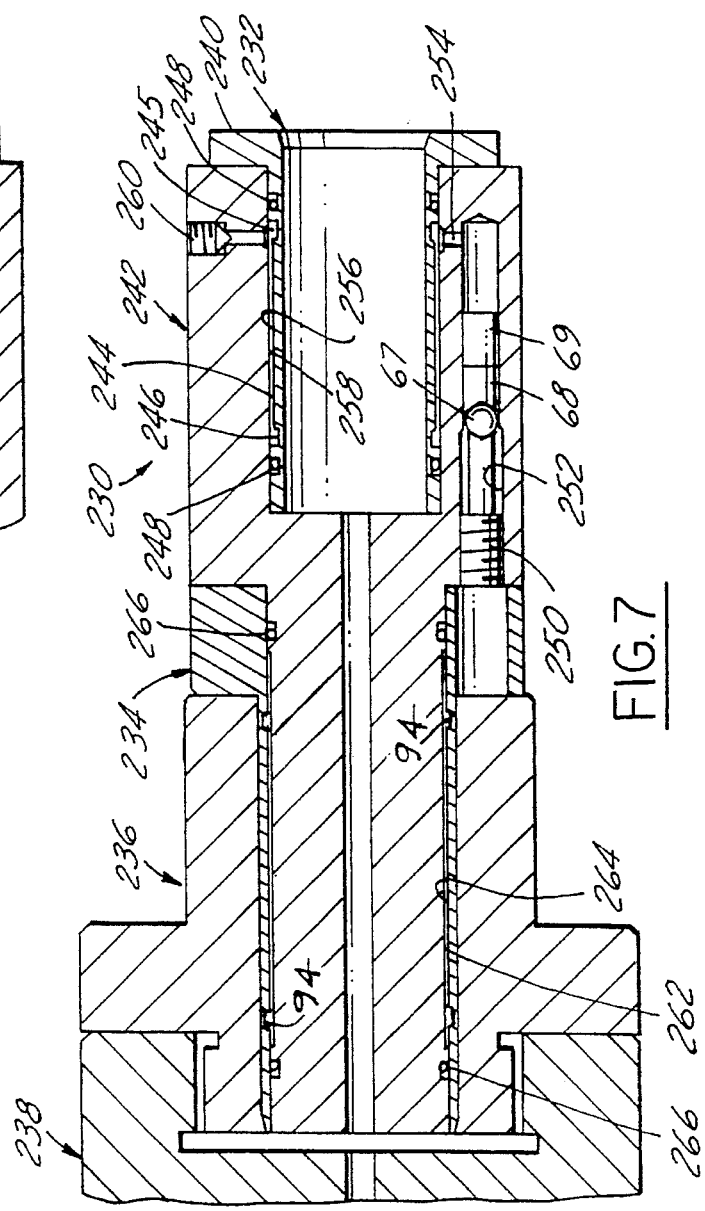
FIG. 7 is a fragmentary view of a modified tool holder embodying this invention received in a chuck carried by a spindle.

FIGS. 7–9 illustrate a modified holder 230 embodying this invention which has both a sleeve 232 which can be contracted to hold the cutting tool 12 and a sleeve 234 which can be expanded to releasably secure the holder in a chuck 236 mounted on a spindle 238. Preferably, the spindle has adjustment screws 134 and the chuck adjustment screws 138 for fine tuning and adjusting the alignment of the axis of the tool holder with the spindle and to elminate any eccentricity or orbital movement of the cutter 132 of the tool 12.

The inner sleeve 232 has a flange 240 at one end secured by cap screws (not shown) to the body 242 of the holder and a reduced diameter central section 244 with a reduced diameter groove 246 and a groove 248 containing O-ring seals adjacent each end. The sleeve is actuated by a threaded plunger 250 received in a bore 252 and driving the ball 67 against a brass disk 68 and a TEFLON® or PTFE disk 69. The passage is filled with heavy grease and communicates through the port 254 with an annular chamber 256 defined by the sleeve and a bore 258 in the holder. Typically, the port 254 is formed by a bore through the holder which is closed at one end and sealed by a screw 260 threaded into a counterbore.

The external sleeve 234 in cooperation with an annular groove 262 in the body defines a chamber 264 which is sealed at its ends by O-rings received in grooves 266 in the body. The external sleeve is actuated by a second plunger 268 threaded in a passage 270 and driving a ball 67 against a brass disk 68 behind a TEFLON® disk 69. The passage 270 communicates with the chamber 264 through passages 272 & 274 in the sleeve 234 and an annular coupler 276 with a central through passage 278 and grooves 280 containing O-rings providing a seal between them.

In using the holder 230, the shank 130 of the tool 12 is disposed in the sleeve 232 and the sleeve is hydraulically forced radially inward to grip the tool shank by actuating the plunger 250. The holder is then disposed in the chuck and releasably secured therein by actuating the plunger 268 to hydraulically expand the sleeve 234 into gripping engagement with the chuck 236. If needed, the screws 134 and 138 may then be adjusted to align the axis of the tool holder with the axis of rotation of the spindle and to essentially eliminate any eccentricity or orbital movement of the rotating cutter 132 on the tool 12.

What is claimed is:

1. A tool holder for releasably retaining a cutting tool having a central shank and a cutter for machining a workpiece which comprises: a holder body constructed to be mounted on a rotating machine spindle, said holder body having a central bore, a cylindrical pressure sleeve within said central bore of said body constructed to receive a shank of a tool therein and having an axially elongate and annular pressure chamber defined by the cooperation of an annular recess therein with said bore of said body, said sleeve having adjacent each axial end of said recess a first groove having a bottom of smaller diameter than the diameter of said recess and a second annular groove with a seal received therein providing a seal between said annular recess and said bore of said body, and a hydraulic actuator communicating with said annular pressure chamber to pressurize fluid in said annular chamber to urge said sleeve into firm engagement with said shank of the tool to releasably secure the tool in said holder.

2. The tool holder as defined in claim 1 wherein said sleeve is secured to said holder adjacent only one end of said sleeve.

3. A tool holder for releasably retaining a cutting tool having a central shank and a cutter for machining a workpiece which comprises: a holder body constructed to be mounted on a rotating machine spindle, said holder body having a central bore, a cylindrical pressure sleeve within said central bore of said body constructed to receive a shank of a tool therein and having an axially enlongate and annular pressure chamber defined by the cooperation of an annular recess therein with said bore of said body, said sleeve having adjacent each axial end of said recess a first groove having a bottom of smaller diameter than the diameter of said recess and a second annular groove with a seal received therein providing a seal between said annular recess and said bore of said body, a hydraulic actuator communicating with said annular pressure chamber to pressurize fluid in said annular chamber to urge said sleeve into firm engagement with said shank of the tool to releasably secure the tool in said holder, and at least one work processing cutter on an outer diameter of said holder body and overlying said sleeve so that when said actuator forces said sleeve into gripping engagement with the shank of the tool it can also expand said tool body to adjust and control the effective diameter of the work processing cutter on said tool body.

4. The tool holder as defined in claim 3 which also comprises at least two work processing cutters on an outer diameter of said tool body and overlying said sleeve, and said work processing cutters are substantially equally circumferentially spaced about said holder body.

5. A tool holder for releasably retaining a cutting tool having a central shank and a cutter for machining a workpiece which comprises: a holder body constructed to be mounted on a rotating machine spindle, said holder body having a central bore, a cylindrical pressure sleeve within said central bore of said body constructed to receive a shank of a tool therein and having an axially enlongate and annular pressure chamber defined by the cooperation of an annular recess therein with said bore of said body, said sleeve having .adjacent each axial end of said recess a first groove having a bottom of smaller diameter than the diameter of said recess and a second annular groove with a seal received therein providing a seal between said annular recess and said bore of said body, a hydraulic actuator communicating with said annular pressure chamber to pressurize fluid in said annular chamber to urge said sleeve into firm engagement with said shank of the tool to releasably secure the tool in said holder, said body also has a generally cylindrical shank axially spaced from said sleeve and an external sleeve slidably received over said shank, at least one of said shank and said external sleeve having an annular recess therein defining between them an axially elongate and annular second pressure chamber, and a second hydraulic actuator communicating with said second chamber to pressurize fluid therein to urge said external sleeve into engagment with a cylindrical wall of a chuck to releasably secure the tool holder in the chuck.

6. A tool and tool holder for contacting and working a workpiece which comprises:

(a) a tool body to be mounted on a rotating machine spindle, said tool body having a central bore, (b) work processing means on an outer diameter of said tool body, (c) a cylindrical pressure sleeve within said central bore of said body having an elongate annular pressure chamber on one surface thereof and having a cylindrical central opening, (d) a central core with in said central opening of said sleeve to provide a reaction member, and (e) a hydraulic actuator to pressurize fluid in said annular chamber to urge said sleeve onto said core means to grip and centralize said core.

7. A tool and tool holder as defined in claim 6 in which said central core reaction member comprises a work processing tool having a shank serving as said core reaction member and a working end projecting from said tool body centrally thereof, said hydraulic actuator to pressurize said annular chamber being releasable to permit ready removal and replacement of said shank and tool.

8. A tool and tool holder as defined in claim 6 wherein said tool body has a cylindrical portion essentially coaxial with said central bore and spaced from said annular pressure chamber and constructed and arranged to be slidably received in another cylindrical pressure sleeve carried by the spindle for coaxially mounting said tool body on the spindle for rotation therewith.

9. A tool and tool holder as defined in claim 6 wherein said tool body also comprises a frusto conical portion essentially coaxial with said central bore and spaced from said annular pressure chamber, said frusto conical portion being constructed and arranged to be slidably received in a complementary recess in a machine spindle for coaxially mounting said tool body on the spindle for rotation therewith.

10. A tool and tool holder as defined in claim 6 wherein said work processing means comprises at least two cutter inserts carried by said tool body for machining the workpiece.

11. A tool and tool holder as defined in claim 10 wherein said inserts are removably carried by said tool body.

12. A tool and tool holder as defined in claim 6 wherein said work processing means comprises at least two cutter inserts carried by a nose piece releasably secured to said tool body for machining a workpiece.

13. A tool and tool holder as defined in claim 6 wherein said cylindrical pressure sleeve has an annular recess therein defining in part said pressure chamber, a first groove adjacent each end of said annular recess which has a bottom with a smaller diameter than the diameter of said recess and a second groove adjacent each end of said recess and disposed between said first groove and the adjacent end of said sleeve and having a seal therein providing a fluid tight seal between said sleeve and said body.

14. A tool and tool holder for entering and working a workpiece which comprises:

(a) a tool body to be mounted on a rotating machine spindle, said tool body having a central bore, (b) a work processing cutter on an outer diameter of said tool body, (c) a work processing tool having a working end extending axially from said central bore of said body and having a holding shank within said central bore, and (d) a hydraulic actuator in said tool body between the outer diameter of said tool body and said central bore to grip and centralize said shank in said bore and to expand said tool body to control the effective diameter of the work processing cutter on said tool body.

15. A tool and tool holder as defined in claim 14 in which said tool body has a plurality of diameters spaced axially of said tool body, and said central bore extends through said body to underlie said diameters, a plurality of cylindrical pressure sleeves in said central bore, each having annular pressure chambers and being substantially axially co-extensive with a particular diameter of said body, said central core extending through said respective sleeves, and said hydraulic actuator to pressurize said annular chambers comprises, individual hydraulic actuators for each said pressure sleeve to exert individual expanding force on each tool diameter.

16. A tool and tool holder as defined in claim 14 in which said central core reaction member comprises a work processing tool having a shank serving as said core reaction member and a working end projecting from said tool body centrally thereof, said hydraulic actuator to pressurize said annular chamber being releasable to permit ready removal and replacement of said shank an d tool.

17. A tool and tool holder as defined in claim 14 wherein said cylindrical pressure sleeve has an annular recess therein defining in part said pressure chamber, a first groove adjacent each end of said annular recess which has a bottom with a smaller diameter than the diameter of said recess and a second groove adjacent each end of said recess and disposed between said first groove and the adjacent end of said sleeve and having a seal therein providing a fluid tight seal between said sleeve and said body.

18. A tool, tool holder and chuck for machining a workpiece which comprises, a tool body having a central bore and a cylindrical portion mountable on a chuck for rotation with a machine spindle, a chuck mountable on the machine spindle and having a central bore therein, a first cylindrical pressure sleeve within said central bore of said chuck and having an annular pressure chamber on one surface thereof and a cylindrical central opening constructed and arranged to receive said cylindrical portion of said tool body, a first hydraulic actuator to pressurize said annular chamber to urge said first sleeve into engagement with said cylindrical portion of said tool holder to grip and secure said tool holder in said chuck, a second cylindrical pressure sleeve within said central bore of said tool body and having an elongate annular pressure chamber on one surface thereof and a cylindrical central opening, and a second hydraulic actuator to pressurize said annular chamber in said tool holder to urge said second sleeve into engagement with a central core within said central opening of said second sleeve to engage, retain and centralize the central core therein.

19. A tool, tool holder and chuck as defined in claim 18 which also comprises a work processing tool having a shank serving as the central core received in said second sleeve and projecting from said tool body centrally thereof.

20. A tool, tool holder and chuck as defined in claim 18 which also comprises a work processing cutter on an outer diameter of said tool body for machining a workpiece.

21. A tool, tool holder and chuck as defined in claim 18 which also comprises a set of at least three equally circumferentially spaced adjustment screws each received in an axial passage through said chuck and constructed to bear on the spindle to adjust and minimize any eccentricity of the cutter of a work processing tool with a shank serving as the central core received in said second sleeve and projecting from the tool body centrally thereof.

22. A tool, tool holder and chuck as defined in claim 18 wherein said chuck has a cylindrical portion coaxial with the central bore in said chuck and receivable in a central recess in the spindle and which also comprises a set of at least three equally circumferentially spaced adjustment screws each received in a radial passage in the spindle opening into the recess in the spindle and the adjustment screws are constructed to bear on said cylindrical portion of said chuck when received in the recess to adjust the location of said chuck so that the axis of said tool holder is concentric with the axis of rotation of the machine spindle on which said chuck is received for rotation therewith.

23. A tool, tool holder and chuck as defined in claim 18 wherein said cylindrical pressure sleeve has an annular recess therein defining in part said pressure chamber, a first groove adjacent each end of said annular recess which has a bottom with a smaller diameter than the diameter of said recess and a second groove adjacent each end of said recess and disposed between said first groove and the adjacent end of said sleeve and having a seal therein providing a fluid tight seal between said sleeve and said body.

24. A tool holder receivable in a bore in a chuck for machining a workpiece which comprises, a holder body having a central bore and a cylindrical portion receivable in a bore in a chuck for rotation with a machine spindle, a first cylindrical pressure sleeve received on said cylindrical portion of said holder body, having an annular pressure chamber between them, and constructed and arranged to be received in the bore of the chuck, a first hydraulic actuator to pressurize said annular chamber to urge said first sleeve into engagement with the chuck to grip and secure said holder body to the chuck, a second cylindrical pressure sleeve within said central bore of said holder body and having an elongate annular second pressure chamber between them and a cylindrical central opening, and a second hydraulic actuator to pressurize said second annular chamber in said holder body to urge said second sleeve into engagement with a central core within said central opening of said second sleeve to engage, retain and centralize the central core therein.

25. A tool holder as defined in claim 24 which also comprises a work processing tool having a shank serving as the central core received in said second sleeve and projecting from said tool body centrally thereof.

26. A tool holder as defined in claim 24 which also comprises a work processing cutter on an outer diameter of said holder body for machining a workpiece.

* * * * *